(12) United States Patent
Hagino et al.

(10) Patent No.: US 8,356,417 B2
(45) Date of Patent: Jan. 22, 2013

(54) SPHERICAL-FORM MEASURING APPARATUS

(75) Inventors: Takeshi Hagino, Tsukuba (JP); Yuichiro Yokoyama, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 240 days.

(21) Appl. No.: 13/009,227

(22) Filed: Jan. 19, 2011

(65) Prior Publication Data

US 2011/0173830 A1 Jul. 21, 2011

(30) Foreign Application Priority Data

Jan. 20, 2010 (JP) .................................. 2010-009805
Aug. 17, 2010 (JP) .................................. 2010-182096

(51) Int. Cl.
*G01B 7/28* (2006.01)
*G01B 5/20* (2006.01)

(52) U.S. Cl. ............................ 33/553; 33/550; 33/555.1

(58) Field of Classification Search .................... 33/553, 33/1 BB, 502, 549, 550, 554, 555.1

See application file for complete search history.

(56) References Cited

U.S. PATENT DOCUMENTS

| | | | | |
|---|---|---|---|---|
| 2,785,474 A | * | 3/1957 | Mages et al. ..................... | 33/501 |
| 3,125,811 A | * | 3/1964 | Pierce et al. ..................... | 33/550 |
| 4,414,748 A | * | 11/1983 | Gauler et al. .................... | 33/573 |
| 5,359,784 A | * | 11/1994 | Tomida et al. ................... | 33/550 |
| 5,926,781 A | * | 7/1999 | Scott .............................. | 702/151 |
| 6,314,655 B1 | * | 11/2001 | Quintavalla et al. .......... | 33/555.1 |
| 6,327,788 B1 | * | 12/2001 | Seddon et al. ................... | 33/551 |
| 6,546,640 B2 | * | 4/2003 | Okada et al. .................... | 33/503 |
| 6,886,264 B2 | * | 5/2005 | Sakata et al. .................... | 33/502 |
| 7,290,348 B2 | * | 11/2007 | Katamachi ....................... | 33/550 |
| 2006/0201010 A1 | * | 9/2006 | Maier et al. ...................... | 33/502 |

FOREIGN PATENT DOCUMENTS

JP  2000-292138  10/2000

* cited by examiner

*Primary Examiner* — Christopher Fulton
(74) *Attorney, Agent, or Firm* — Rankin, Hill & Clark LLP

(57) ABSTRACT

A spherical-form measuring apparatus which efficiently measures the sphericity and the form of a sphere to be measured with use of the mechanism of a roundness measuring machine, including a turntable, a probe for measuring a contour of a sphere to be measured on an equatorial plane parallel to a surface of the turntable, associated with rotation of the turntable, and a holding unit mounted on the turntable, for holding the sphere to be measured, wherein the holding unit positions the center of the sphere to be measured on a rotational axis of the turntable, and holds the sphere to be measured so that the sphere is rotatable about an inclined axis which passes the center of the sphere and is inclined at the angle in the range of −5 degrees-+5 degrees centered on the angle where the sine is $1\sqrt{3}$ (1 divided by the square root of 3) against the surface of the turntable.

2 Claims, 5 Drawing Sheets

SPHERICAL-FORM MEASURING APPARATUS

RELATED APPLICATIONS

This application claims the priority of Japanese Patent Application Nos. 2010-9805 filed on Jan. 20, 2010 and 2010-182096 filed on Aug. 17, 2010, which are incorporated herein by reference.

FIELD OF THE INVENTION

The present invention relates to a spherical-form measuring apparatus, and in particular it relates to improvements in a unit for holding a sphere to be measured.

BACKGROUND OF THE INVENTION

A roundness measuring machine is often used to measure the form deviation of a measured sphere from a perfect sphere (i.e., sphericity). In the industry standard of a "Rolling bearings-Balls" in Japanese Industrial Standards, the sphericity is defined as "The greatest radial distance, in any equatorial plane, between the smallest circumscribed sphere and the greatest inscribed sphere, with their centres common to the least square sphere centre". And information about the measurement of the sphericity of the steel ball is given in annex A of above standard. It is prescribed that "the measurement of the sphericity is carried out by the roundness measuring on three equatorial planes at 90 degrees with each other. The roundness measuring on one equatorial plane to be measured is carried out with its centre common to the least square sphere centre. The roundness in the equatorial plane to be measured is the maximum value of difference in radius in each equatorial plane to be measured" (JIS B1501(2009), Chapter 3.6.1 and Annex A corresponding to ISO3290(2001), Annex A). Also in Chapter 3.2 of Specific Application Documents for Technical Requirements (Form Measuring Machine/Sphere) shown in JCT20116 issued by JCSS, the roundness of a sphere is defined as "the maximum value of roundness measured along the line of intersection with the surface of the sphere and each of three planes which pass through the center of sphere and are substantially orthogonal to each other". Any of the definitions require the measurement of contours, with the roundness measuring machine, along the line of intersection with the surface of a sphere and each of three planes substantially orthogonal to each other.

To achieve this evaluation method, it is necessary to perform an evaluation composed of the following three steps: firstly, aligning a ball in the center of turntable of a roundness measuring machine and then measuring a contour along one of the lines of intersection; secondly, changing the posture of the held ball so that the line of intersection to be measured next is substantially orthogonal to the previously measured line of intersection, and measuring the contour after alignment; and finally, repeating the same operation with the second step.

If such a series of evaluation procedure is conducted manually, the operation will become complicated and difficult because the motion of changing the posture of the held ball twice needs to be performed manually and accurately. Even when a posture controlling device which automatically changes the posture of the held ball is used together with a roundness measuring machine, the development of such mechanism is difficult because it is necessary to devise the handling of ball and have a design in which any physical interference between the posture controlling device and the roundness measuring machine should be avoided (see Japanese Unexamined Patent Publication No. 2000-292138).

DISCLOSURE OF THE INVENTION

Problem to be Solved by the Invention

The present invention was made in view of the above-described conventional technique, and the problem to be solved is to efficiently measure the sphericity and the form of a sphere to be measured with a mechanism similar to the roundness measuring machine.

Means to Solve the Problem

To solve the above-mentioned problem, the present invention provides a spherical-form measuring apparatus, comprising:
a turntable;
a probe for measuring a contour of a sphere to be measured on an equatorial plane parallel to a surface of the turntable, associated with rotation of the turntable; and
a holding unit mounted on the turntable, for holding the sphere to be measured;
wherein the holding unit positions the center of the sphere to be measured on a rotational axis of the turntable, and holds the sphere to be measured so that the sphere to be measured is rotatable about an inclined axis which passes the center of the sphere and is inclined at an angle in the range of −5 degrees~+5 degrees centered on an angle where a sine is $1/\sqrt{3}$ (1 divided by the square root of 3) against the surface of the turntable.

In the apparatus, the sphericity of the sphere to be measured is preferably measured in a way that the holding unit rotates the sphere to be measured by 120 degrees repeatedly about the inclined axis and contour measurement on the equatorial plane of the sphere is performed at every rotated position.

According to the spherical-form measuring apparatus of the present invention, the form of a sphere to be measured can be efficiently measured by measuring the contours while the sphere is rotated about the inclined axis by the holding unit.

Also, in the present invention, it is possible to measure the contours of a sphere to be measured on two or three equatorial planes orthogonal to each other by rotating the sphere by 120 degrees about the inclined line and measuring the contour on each of the equatorial planes. Thus, the sphericity measurement can be performed easily.

Figure 4A:
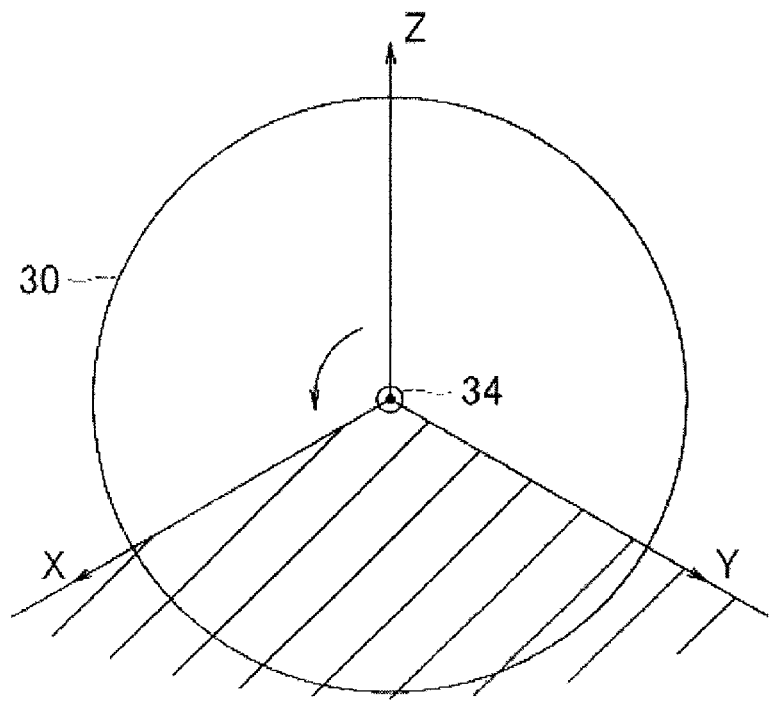
Figure 4B:
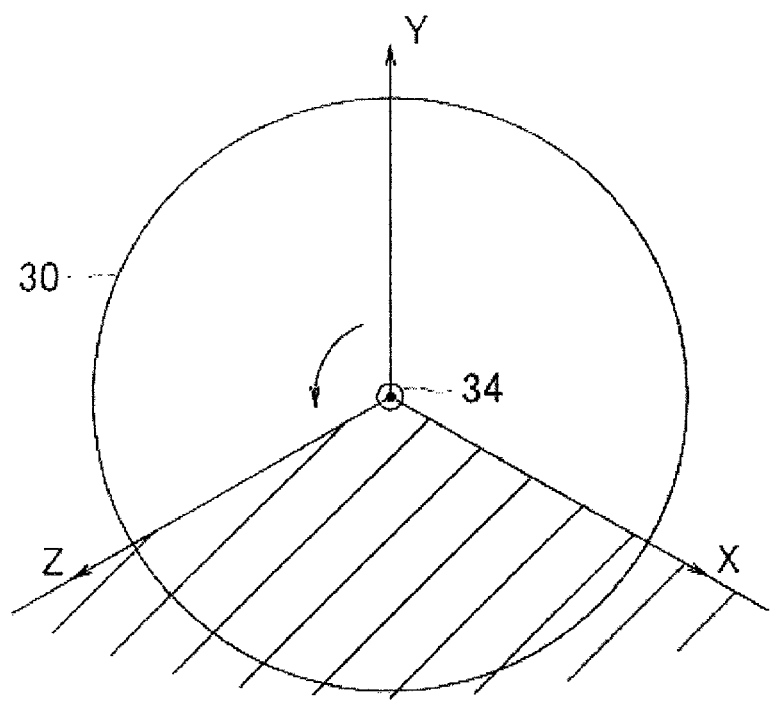

Each of FIGS. 4A and 4B is a schematic view showing the positional relation between an equatorial plane of the measured sphere before rotation and an equatorial plane of the measured sphere after rotation when the sphere is positioned on an inclined axis and is rotated by 120 degrees about the inclined axis.

Figure 5:
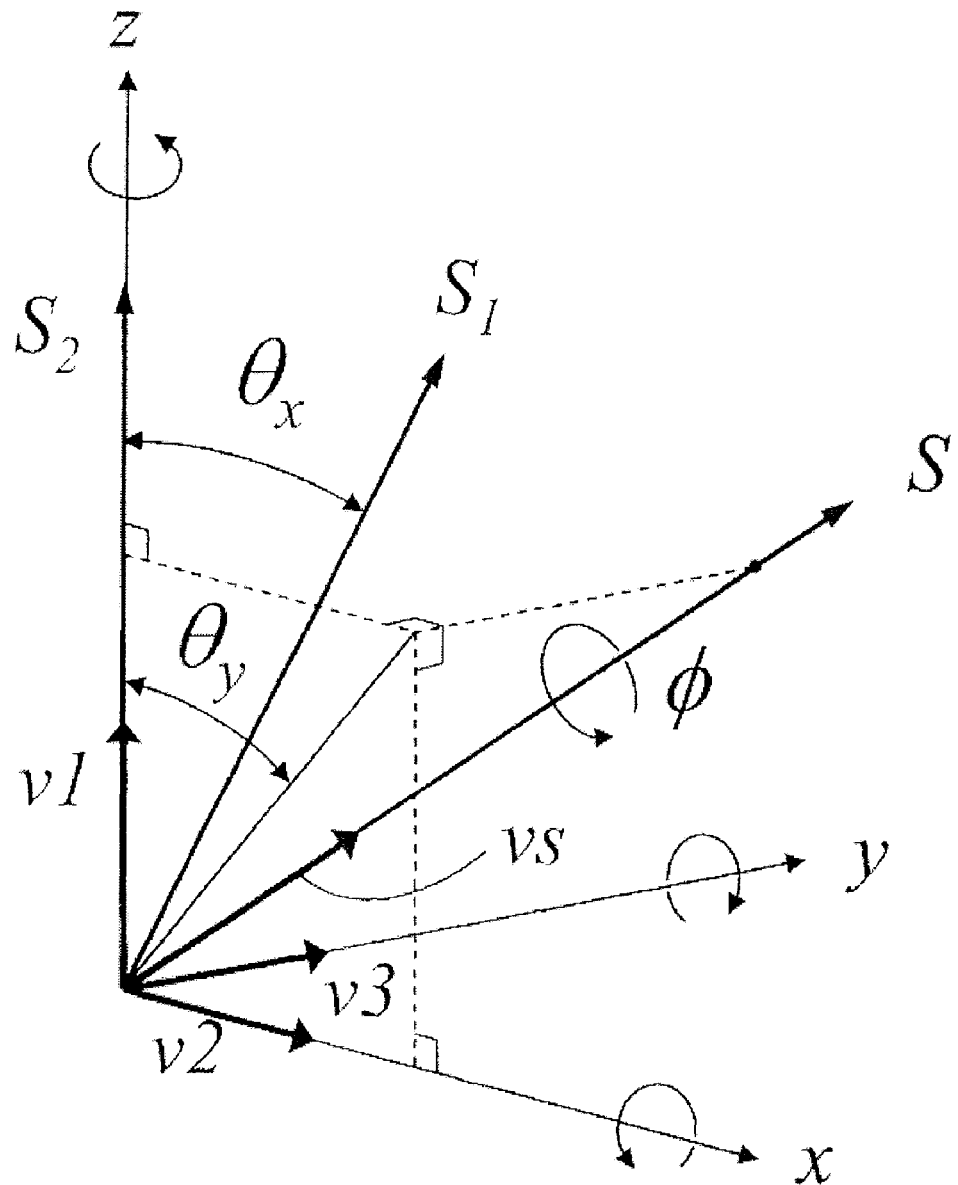

FIG. 5 is a mathematical chart showing the rotating state of a sphere to be measured on the inclined axis in the spherical-form measuring apparatus according to the present invention.

Figure 6:
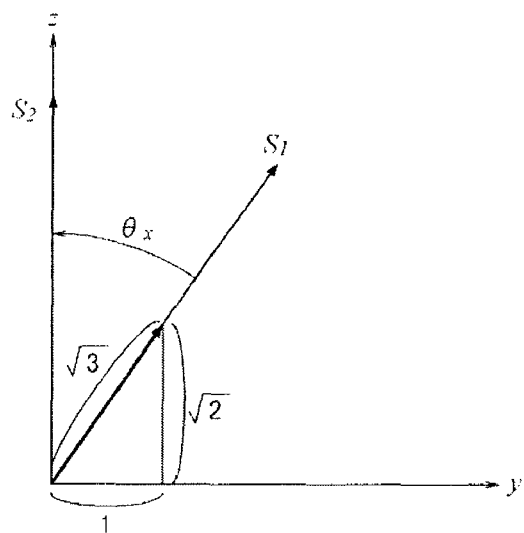

FIG. 6 is a mathematical chart showing the rotating state of a sphere to be measured about the inclined axis in the spherical-form measuring apparatus according to the present invention.

Figure 7:
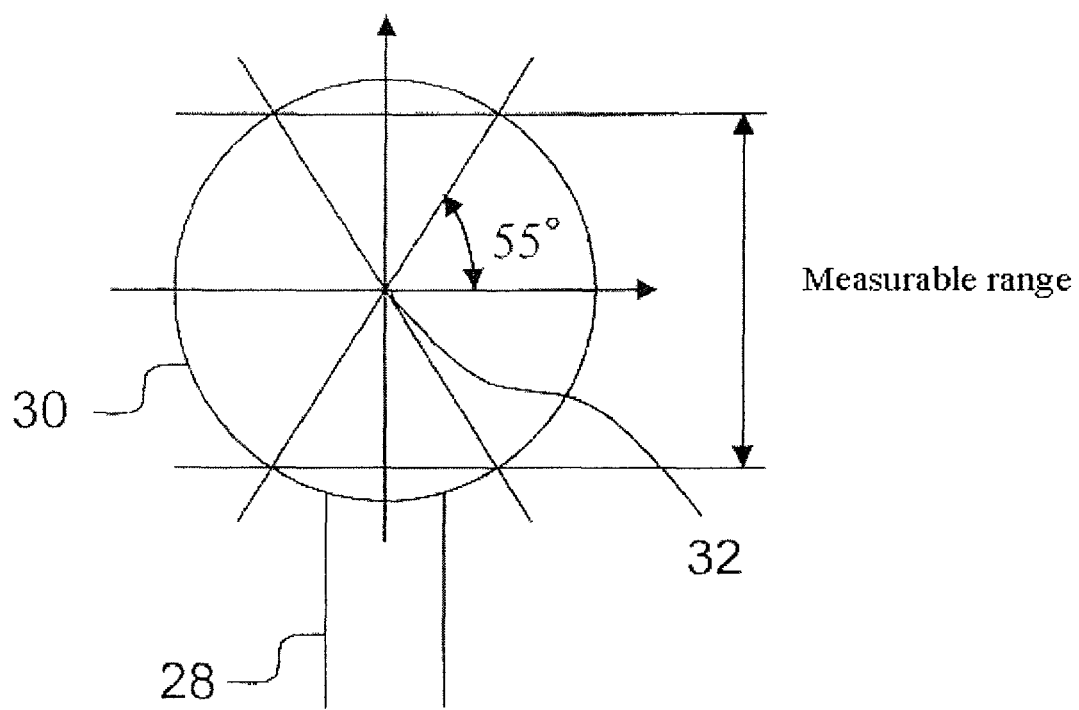

FIG. 7 is a schematic chart showing the range that the contours can be measured by the spherical-form measuring apparatus according to the present invention.

BEST MODE FOR CARRYING OUT THE INVENTION

Hereinafter, preferred embodiments of the present invention will be illustrated based on the figures.

Figure 1:
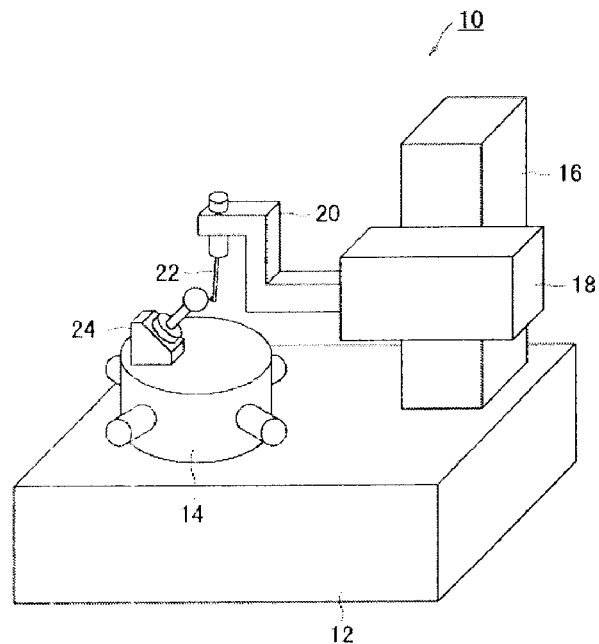
FIG. 1 is an outline view of the spherical-form measuring apparatus according to the present invention.

FIG. 1 is a schematic view of the spherical-form measuring apparatus 10 according to the present invention.

The measuring apparatus 10 shown in FIG. 1 is based on a roundness measuring machine, and it includes a base 12, a turntable 14 rotatably provided on the base 12, a vertical column 16 provided to stand upright on the base 12, a slider 18 provided to the vertical column 16 so as to move in vertical direction, a crank arm 20 held by the slider 18 so as to move toward and away from the slider 18, and a probe 22 provided to the tip of the crank arm 20.

Then, a holding unit 24 that is distinctive in the present invention is mounted on the turntable 14.

Figure 2:
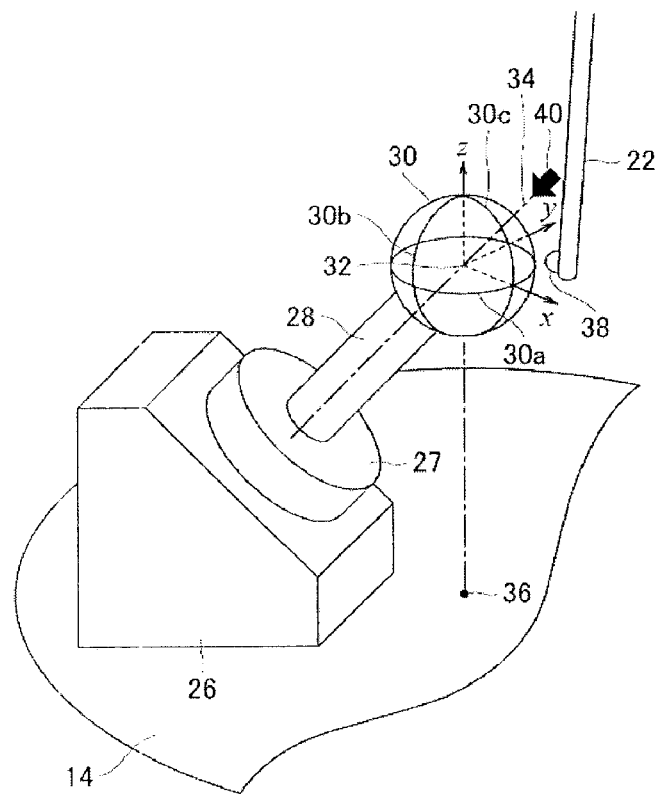
FIG. 2 is a detail view of the vicinity of the holding unit which is distinctive in the present invention.

FIG. 2 shows the detail of the holding unit 24.

As shown in FIG. 2, the holding unit 24 includes a setting base :26 to be provided on the turntable 14, a rotating member 27 provided to the setting base 26, and a rotating arm 28 extending obliquely upwardly from the rotating member 27. A sphere to be measured 30 is put on the end of the rotating arm 28. The angle of the rotating arm 28 with respect to the turntable 14 is set to be an angle that the sine is $1/\sqrt{3}$ (i.e., about 35.3 degrees).

In the embodiments of the present invention, an X-Y-Z coordinate system that its origin is a center 32 of the sphere 30 is virtually set, and an inclined rotational axis 34 of the rotating arm 28 is also set to pass the center 32.

The Z-axis of the X-Y-Z coordinate system passes a rotational center 36 of the turntable 14.

Figure 3:
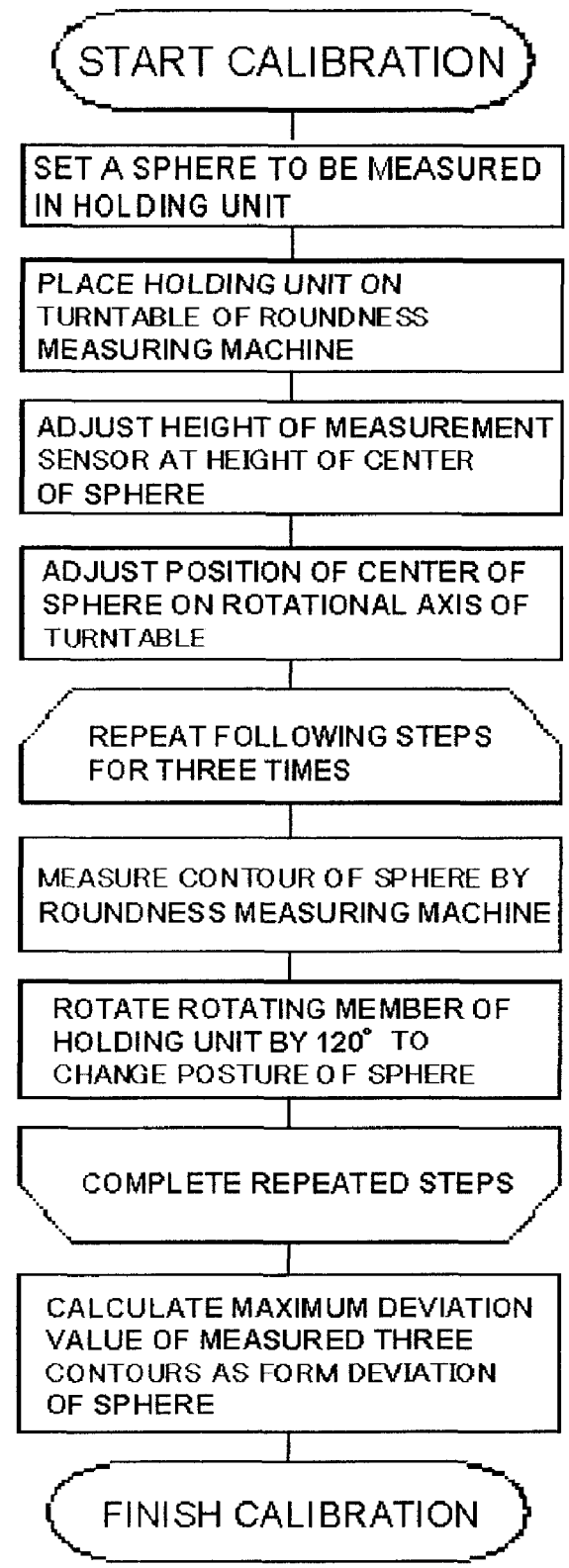
FIG. 3 is a flowchart showing the process of measuring the sphericity in an embodiment of the present invention.

The spherical-form measuring apparatus 10 according to the present embodiments is substantially configured as mentioned above. Next, the operation of the spherical-form measuring apparatus 10 will be illustrated with taking a sphericity measurement for example, referring to the flowchart shown in FIG. 3.

In the present embodiments, the sphere 30 is firstly put on the holding unit 24 detachable from the turntable 14, and then the holding unit 24 now holding the sphere 30 is placed on the turntable 14.

In the context of positioning the sphere 30 on the holding unit 24, when the sphere 30 has a shaft such as a reference sphere used in a three-dimensional coordinate measuring apparatus, the shaft can be used as the rotating arm 28. When the sphere 30 does not have a shaft, it can be positioned on the rotating arm 28 by a magnet if it is a magnetic body such as a steel ball for bearing, or by vacuum suction or the like if it is a nonmagnetic body such as a ceramic ball.

As mentioned above, the probe 22 can be positioned in any position adjacent to the rotational center 36 of the turntable 14 by the vertical movement of the slider 18 and the movement of the crank arm 20 toward and away from the slider 18 (i.e., the movement in the horizontal direction).

Next, in the state shown in FIG. 2, a tip 38 of the probe 22 is positioned at the maximum diameter portion of the sphere 30 (i.e., at the height of the center of the sphere 30) by operating the probe 22, and the center 32 of the sphere 30 is positioned on the vertical rotational axis of the turntable 14. This maximum diameter portion corresponds to the equatorial plane of the sphere 30 on the X-Y plane. In this state, when the turntable 14 is rotated, the contour on the X-Y plane can be measured by the probe 22.

Next, the rotating arm 28 is rotated by 120 degrees about the inclined rotational axis 34. In the present embodiments, when the rotating arm 28 is rotated by 120 degrees counterclockwise viewed in the direction of an arrow 40 on the inclined rotational axis 34, the Z-X plane becomes a plane parallel to the turntable 14 (corresponding to the X-Y plane before rotated by 120 degrees).

Then, in this state, when the turntable 14 is rotated, the contour on the Z-X plane can be measured.

When the rotating arm 28 is further rotated by 120 degrees, the plane parallel to the rotational surface of the turntable 14 becomes the Y-Z plane. In this state, by rotating the turntable 14, the contour on the Y-Z plane can be measured.

With the above-mentioned operation, the contour measurement of the sphere 30 can be performed on the X-Y, Z-X, and Y-Z planes orthogonal to each other, resulting in the completion of the sphericity measurement.

FIGS. 4A and 4B show the relationship between the rotation of the rotating arm 28 and the state of the transformation of coordinate system in the sphericity measurement in the present embodiments. In FIGS. 4A and 4B, the sphere 30 and the X-Y-Z coordinate axis system viewed in the direction of the arrow 40 in FIG. 2 are schematically shown, and the X-axis, Y-axis, and Z-axis open equi-angularly from the rotational axis 34 (respectively 120 degrees in the projected state to the paper). In the initial state, the X-Y plane (the plane with diagonal lines in FIG. 4A) is parallel to the turntable 14.

Then, when the rotating arm 28 is rotated by 120 degrees in the counterclockwise direction from the initial state, the Z-X plane (the plane with diagonal lines in FIG. 4B) comes to the position of the X-Y plane before rotating. When the rotating arm 28 is further rotated by 120 degrees, the Y-Z plane becomes the plane parallel to the turntable 14.

Since these X-Y, Z-X, and Y-Z planes are the equatorial planes of the sphere 30 orthogonal to each other, "the contour measurement of the sphere to be measured 30 on three equatorial planes orthogonal to each other" can be achieved by measuring the contours on each of these X-Y, Z-X, and Y-Z planes.

The above-mentioned context will be explained with mathematical formulas below.

The orthogonal coordinate system shown in FIG. 5 will be considered. In this coordinate system, a great circle 30$a$ shown in FIG. 2 is a contour circle on the X-Y plane, a great circle 30$b$ is a contour circle on the Y-Z plane, and a great circle 30$c$ is a contour circle on the Z-X plane. When a normal vector of the plane determined by each of the three great circles is respectively represented by v1, v2, and v3, v1=(0, 0,1), v2=(1,0,0), and v3=(0,1,0). When the inclined rotational axis 34 of the rotating arm 28 is represented by S-axis, a direction vector $v_s$ of the S-axis is defined as $v_s=(1,1,1)$ in the coordinate system in FIG. 5. A rotation of the rotating arm 28 by an angle φ about the inclined rotational axis 34 is equal to a rotation of the sphere 30 and the rotating arm 28 by the angle φ about the S-axis in FIG. 5.

To simply consider the rotation about the S-axis, the coordinate is transformed so that the S-axis coincides with the Z-axis, and the rotation about the S-axis is replaced with the rotation about the Z-axis. Hereinafter, the positive direction of rotation is assumed to be the direction of the rotation of a right-screw when the right-screw travels in a positive direction of the S-axis.

Firstly, an angle between the Y-Z plane and the axis that the S-axis is projected on the X-Z plane is represented by $\theta y$. When the S-axis is rotated by the angle $-\theta y$ about the Y-axis, the rotated axis becomes the axis on Y-Z plane. The coordinate transformation matrix R1 corresponding to the rotation by the angle $-\theta y$ about the Y-axis can be represented by the formula (1). Here, when the $v_s=(1,1,1)$, the actual value of the $\theta y$ is 45 degrees. When the axis rotationally transformed so that the rotated S-axis becomes the axis on Y-Z plane is represented by $S_1$, and the directional vector of the $S_1$-axis is represented by $vs_1$, the directional vector $vs_1$ can be calculated with the coordinate transformation matrix $R_1$ and the direction vector $v_s$ according to the formula (2). From the result, as the X-component of the directional vector $vs_1$ is 0, the transformation into the axis on the Y-Z plane can be proved.

$$R_1 = \begin{bmatrix} \cos(-\theta_y) & 0 & \sin(-\theta_y) \\ 0 & 1 & 0 \\ -\sin(-\theta_y) & 0 & \cos(-\theta_y) \end{bmatrix} = \begin{bmatrix} \cos(\theta_y) & 0 & -\sin(\theta_y) \\ 0 & 1 & 0 \\ \sin(\theta_y) & 0 & \cos(\theta_y) \end{bmatrix} \quad (1)$$

$$vs_1^T = R_1(\theta_y = 45°) \times vs^T = \begin{bmatrix} \frac{\sqrt{2}}{2} & 0 & -\frac{\sqrt{2}}{2} \\ 0 & 1 & 0 \\ \frac{\sqrt{2}}{2} & 0 & \frac{\sqrt{2}}{2} \end{bmatrix} \begin{Bmatrix} 1 \\ 1 \\ 1 \end{Bmatrix} = \begin{Bmatrix} 0 \\ 1 \\ \sqrt{2} \end{Bmatrix} \quad (2)$$

Next, an angle between the $S_1$-axis and the Z-axis is represented by $\theta x$. When the $S_1$-axis is rotated by the angle $\theta x$ about the X-axis, the rotated $S_1$-axis comes to coincide with the Z-axis. The coordinate transformation matrix $R_2$ which means the rotation by the angle $\theta x$ about the X-axis can be represented by the formula (3). The axis rotationally transformed so that the $S_1$-axis coincides with the Z-axis is represented by $S_2$, and a directional vector of the $S_2$-axis is represented by $vs_2$. The relation between the $S_1$-axis and $S_2$-axis on the Y-Z plane is shown in FIG. 6. As the directional vector of the $S_1$-axis is $vs_1=(0,1,\sqrt{2})$ according to the formula (2), $\cos(\theta x)=\sqrt{6}/3$, $\sin(\theta x)=\sqrt{3}/3$ can be proved from the relation in FIG. 6.

The directional vector $vs$, can be calculated from the coordinate transformation matrix $R_2$ and the directional vector $vs$, according to the formula (4). From the result, as both of the X-component and Y-component of the vector $vs_2$ are 0, the transformation into the axis which coincides with the Z-axis can be proved.

$$R_2 = \begin{bmatrix} 1 & 0 & 0 \\ 0 & \cos(\theta_x) & -\sin(\theta_x) \\ 0 & \sin(\theta_x) & \cos(\theta_x) \end{bmatrix} \quad (3)$$

$$vs_2^T = R_2(\theta_x) \times vs_1^T = \begin{bmatrix} 1 & 0 & 0 \\ 0 & \frac{\sqrt{6}}{3} & -\frac{\sqrt{3}}{3} \\ 0 & \frac{\sqrt{3}}{3} & \frac{\sqrt{6}}{3} \end{bmatrix} \begin{Bmatrix} 0 \\ 1 \\ \sqrt{2} \end{Bmatrix} = \begin{Bmatrix} 0 \\ 0 \\ \sqrt{3} \end{Bmatrix} \quad (4)$$

Next, the rotation by an angle $\phi$ about the Z-axis will be considered. In the present invention, the contour along the line where the surface of the sphere intersects with each of three planes orthogonal to each other is evaluated by rotating the sphere 30 by 120 degrees repeatedly about the inclined rotational axis 34 and performing the contour measurement for three times. That is, it can be defined that $\phi=120$ degrees. Thus, the coordinate transformation matrix $R_3$ which means the rotation by the angle $\phi$ about the Z-axis and the actual value of the component of $R_3$ when $\phi=120$ degrees can be represented by the formula (5).

$$R_3 = \begin{bmatrix} \cos\phi & -\sin\phi & 0 \\ \sin\phi & \cos\phi & 0 \\ 0 & 0 & 1 \end{bmatrix} = \begin{bmatrix} -\frac{1}{2} & -\frac{\sqrt{3}}{2} & 0 \\ \frac{\sqrt{3}}{2} & -\frac{1}{2} & 0 \\ 0 & 0 & 1 \end{bmatrix} \quad (5)$$

With the above-mentioned flow, by the coordinate transformation, the rotation about the S-axis can be replaced with the rotation about the Z-axis. Then, after the rotation by the angle $\phi$ about the Z-axis, there is a need to transform the coordinate so that the $S_2$-axis coincides with the S-axis again. For this, it is only necessary to calculate the matrix that the positive and negative signs of the rotational angle are exchanged each other in the matrix $R_1$ and $R_2$. Thus, the coordinate transformation matrix $R_4$ which means the rotation in the opposite direction of the matrix $R_2$ and the coordinate transformation matrix $R_5$ which means the rotation in the opposite direction of the matrix $R_1$ can be respectively represented by the formulas (6) and (7).

$$R_4 = \begin{bmatrix} 1 & 0 & 0 \\ 0 & \cos(-\theta_x) & -\sin(-\theta_x) \\ 0 & \sin(-\theta_x) & \cos(-\theta_x) \end{bmatrix} \quad (6)$$

$$= \begin{bmatrix} 1 & 0 & 0 \\ 0 & \cos(\theta_x) & \sin(\theta_x) \\ 0 & -\sin(\theta_x) & \cos(\theta_x) \end{bmatrix}$$

$$= \begin{bmatrix} 1 & 0 & 0 \\ 0 & \frac{\sqrt{6}}{3} & \frac{\sqrt{3}}{3} \\ 0 & -\frac{\sqrt{3}}{3} & \frac{\sqrt{6}}{3} \end{bmatrix}$$

$$R_5 = \begin{bmatrix} \cos(\theta_y) & 0 & \sin(\theta_y) \\ 0 & 1 & 0 \\ -\sin(\theta_y) & 0 & \cos(\theta_y) \end{bmatrix} = \begin{bmatrix} \frac{\sqrt{2}}{2} & 0 & \frac{\sqrt{2}}{2} \\ 0 & 1 & 0 \\ -\frac{\sqrt{2}}{2} & 0 & \frac{\sqrt{2}}{2} \end{bmatrix} \quad (7)$$

Finally, the coordinate transformation matrix Rs for the rotation about the S-axis can be calculated by sequentially multiplying the coordinate transformations matrices $R_1$ to $R_5$ from before backward in the formula (8). The calculation process is omitted; however, the formula (8) results in a simple matrix such as the formula (9) when calculating the matrix Rs by assigning the actual values of the above-mentioned angles $\theta x$, $\theta y$, and $\phi$.

$$R_S = R_5 \times R_4 \times R_3 \times R_2 \times R_1 \quad (8)$$

$$R_s = \begin{bmatrix} 0 & 0 & 1 \\ 1 & 0 & 0 \\ 0 & 1 & 0 \end{bmatrix} \quad (9)$$

To evaluate the vector (x', y', z'), which is the result that any vector (x, y, z) is rotated by the angle $\phi$ about the S-axis, with the formula (9), it is only necessary to perform the calculation in the formula (10).

$$\begin{Bmatrix} x' \\ y' \\ z' \end{Bmatrix} = R_s \begin{Bmatrix} x \\ y \\ z \end{Bmatrix} \quad (10)$$

The normal vectors of the great circles of a sphere to be actually measured will be considered with the formula (10). The sphere 30 is placed on the turntable 14 of the roundness measuring machine via the setting base 26, and the normal vector of the great circle 30a measured in the initial state is assumed that v1=(0,0,1). When the vector after the normal vector v1 is rotated by 120 degrees about the S-axis is represented by v1', the vector v1' can be calculated as the formula (11) with the formula (10). The vector v1' coincides with the above-mentioned normal vector v2 of the great circle 30b.

$$v1' = R_s \times v1 = \begin{bmatrix} 0 & 0 & 1 \\ 1 & 0 & 0 \\ 0 & 1 & 0 \end{bmatrix} \begin{Bmatrix} 0 \\ 0 \\ 1 \end{Bmatrix} = \begin{Bmatrix} 1 \\ 0 \\ 0 \end{Bmatrix} \quad (11)$$

When the vector after the v2 is rotated by 120 degrees about the S-axis is represented by v2', the vector v2' can be calculated as the formula (12) with the formula (10). The vector v2' coincides with the above-mentioned normal vector v3 of the great circle 30c.

$$v2' = R_s \times v2 = \begin{bmatrix} 0 & 0 & 1 \\ 1 & 0 & 0 \\ 0 & 1 & 0 \end{bmatrix} \begin{Bmatrix} 1 \\ 0 \\ 0 \end{Bmatrix} = \begin{Bmatrix} 0 \\ 1 \\ 0 \end{Bmatrix} \quad (12)$$

As mentioned above, the different three contours can be measured with the roundness measuring machine by rotating the sphere 30 by 120 degrees repeatedly about the inclined rotational axis 34. Also, from the elements in the normal vectors v1, v2, and v3, the three contours are apparently orthogonal to each other. Thus, according to the spherical-form measuring apparatus of the present invention, it is possible to easily evaluate and calibrate the form deviation of a sphere to be measured from a perfect sphere, which is specified in JIS B1501 or JCT20116.

According to the spherical-form measuring apparatus of the present invention, it is possible to measure the form deviation on various great circles by arbitrarily setting the rotational angle of the rotating member 27. For example, as the measurement on an enormous number of great circles can be performed by minutely setting the rotational angle, it is also possible to equivalently build a map of contours of the sphere by synthesizing the obtained contours. In this case, considering the operating range of the present apparatus, it is possible to obtain the contours on the planes which intersect with an equatorial circle vertical to the inclined rotational axis 34 of the rotating arm 28 at an angle in the range of about −55 degrees-+55 degrees as shown in FIG. 7. The measurement in the area around the rotating arm 28 or the area at of the top of the sphere 34 in the opposite side to the rotating arm 28 can be achieved by changing the position of the sphere 34 held by the holding member (for example the rotating arm 28) and performing the measurement again.

Also, in the present invention, the angle formed at the intersection of the inclined axis (for example the inclined rotational axis 34) and the surface of the turntable is preferably an angle in which the sine is $1/\sqrt{3}$ (i.e., about 35.3 degrees). However, practically, any angle in the range of −5 degrees-+5 degrees centered on the above-mentioned angle can be used for measuring a spherical form.

Furthermore, by arbitrarily changing the angle of the inclined axis and the rotational angle on the inclined axis, it is also possible to measure the contours on any planes which are not necessarily orthogonal to other planes.

What is claimed is:

1. A spherical-form measuring apparatus, comprising:
   a turntable:
   a probe for measuring a contour of a sphere to be measured on an equatorial plane parallel to a surface of the turntable, associated with rotation of the turntable; and
   a holding unit mounted on the turntable, for holding the sphere to be measured;
   wherein the holding unit positions the center of the sphere to be measured on a rotational axis of the turntable, and holds the sphere to be measured so that the sphere to be measured is rotatable about an inclined axis which passes the center of the sphere and is inclined at an angle in the range of −5 degrees-+5 degrees centered on an angle where a sine is $1/\sqrt{3}$ (1 divided by the square root of 3) against the surface of the turntable.

2. The apparatus according to claim 1, wherein a sphericity of the sphere to be measured is measured in a way that the holding unit rotates the sphere to be measured by 120 degrees repeatedly about the inclined axis and contour measurement on the equatorial plane of the sphere is performed at every rotated position.

* * * * *